(12) United States Patent
Boehm

(10) Patent No.: US 8,650,519 B2
(45) Date of Patent: Feb. 11, 2014

(54) AUTOMATED FUNCTIONAL COVERAGE FOR AN INTEGRATED CIRCUIT DESIGN

(75) Inventor: Fritz A. Boehm, Dripping Springs, TX (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 13/223,430

(22) Filed: Sep. 1, 2011

(65) Prior Publication Data

US 2013/0061191 A1    Mar. 7, 2013

(51) Int. Cl.
G06F 17/50 (2006.01)
G06F 9/455 (2006.01)

(52) U.S. Cl.
USPC ........... 716/108; 716/106; 716/111; 716/132; 716/134; 714/30; 714/724; 714/725; 714/726

(58) Field of Classification Search
USPC ........... 716/106, 108, 111, 132, 134; 714/30, 714/724, 725, 726, 738
See application file for complete search history.

(56) References Cited

U.S. PATENT DOCUMENTS

| | | | |
|---|---|---|---|
| 5,650,938 A | 7/1997 | Bootehsaz | |
| 5,684,946 A | 11/1997 | Ellis et al. | |
| 6,675,310 B1 | 1/2004 | Bloom | |
| 6,742,166 B2 | 5/2004 | Foster et al. | |
| 7,089,135 B2 | 8/2006 | Rajsuman et al. | |
| 7,152,194 B2 * | 12/2006 | Vinke et al. | 714/726 |
| 7,181,376 B2 | 2/2007 | Fine et al. | |
| 7,315,972 B1 | 1/2008 | Bapat | |
| 7,539,968 B2 | 5/2009 | Charlebois | |
| 7,856,607 B2 | 12/2010 | Grise | |
| 2002/0038203 A1 * | 3/2002 | Tsuchiya | 703/15 |
| 2004/0216005 A1 * | 10/2004 | Pramanick et al. | 714/30 |
| 2007/0276645 A1 | 11/2007 | Veller et al. | |
| 2007/0288822 A1 * | 12/2007 | Lin et al. | 714/741 |
| 2008/0263489 A1 | 10/2008 | Canada et al. | |
| 2009/0031268 A1 * | 1/2009 | Miranda et al. | 716/6 |
| 2009/0249272 A1 | 10/2009 | Yoda | |

OTHER PUBLICATIONS

U.S. Appl. No. 13/343,103, filed Jan. 4, 2012.
U.S. Appl. No. 13/223,423, filed Sep. 1, 2011.
Office Action in U.S. Appl. No. 13/223,423 issued Jul. 20, 2012.
Non-Final Office Action in related U.S. Appl. No. 13/343,103, Apr. 4, 2013, pp. 1-9.

\* cited by examiner

*Primary Examiner* — Thuan Do
*Assistant Examiner* — Brian Ngo
(74) *Attorney, Agent, or Firm* — Lawrence J. Merkel; Stephen J. Curran; Meyertons, Hood, Kivlin, Kowert & Goetzel, P.C.

(57) ABSTRACT

A method for automated functional coverage includes creating event monitors that monitor signals and events within an IC design based upon timing information in a timing report generated by a timing analysis tool. In particular, speed paths that have a higher timing criticality may be selected for monitoring during simulations of the IC design. In addition, using feedback from the event monitors the test generator patterns may be manipulated to preferentially generate patterns that may exercise signal paths that are being monitored in subsequent simulations.

17 Claims, 7 Drawing Sheets

US 8,650,519 B2

AUTOMATED FUNCTIONAL COVERAGE FOR AN INTEGRATED CIRCUIT DESIGN

BACKGROUND

1. Technical Field

This disclosure relates to integrated circuit (IC) design, and more particularly to functional coverage verification of integrated circuit logic designs.

2. Description of the Related Art

During the IC design cycle, the design must be validated or verified to ensure that the design functions the way that it was intended to function. One way to verify the design is to perform some level of verification. Accordingly, verification includes providing some stimulus to the IC design, monitoring the results during simulation, and determining whether the stimulus exercised the IC design adequately to determine whether or not the design does function as it was designed to. Accordingly, the concept of coverage arises. Coverage refers to the concept of a verification engineer or other designer judging the stimulus applied to a system to verify the IC design.

There are several kinds of coverage available, some of which may be easy to automate. For example, line, path, toggle, and finite state machine coverage may be easily automated. In addition, exhaustive coverage which may test every possible state may be possible on small designs. However, as designs have increased in size and complexity, the number of possible states to cover can approach infinity. Thus, another coverage type may be more appropriate. Functional coverage is a more sophisticated type of coverage that usually involves having knowledge of the architecture of the design so that a relationship between signals can be defined and used to develop the desired coverage. Thus, of the nearly infinite number of states, the states that are the most interesting are selected. However, one drawback of obtaining adequate functional coverage is that the selection process can be both time and resource intensive.

SUMMARY OF THE EMBODIMENTS

Various embodiments of a method for providing automated functional coverage of an integrated circuit (IC) design are disclosed. Broadly speaking, a method is contemplated in which event monitors that monitor signals and events within an IC design are created based upon timing information in a timing report that is generated by a timing analysis tool. In particular, speed paths in the report that have a higher timing criticality may be selected for monitoring during simulations of the IC design. In addition, using feedback from the event monitors, the test generator patterns may be manipulated to preferentially generate patterns that may exercise signal paths that are being monitored in subsequent simulations.

In one embodiment, the method includes receiving a timing analysis report generated from an integrated circuit (IC) design. The timing analysis report includes timing information corresponding to an arrival time of signals conveyed on signal paths in the IC design. The method may also include generating one or more event monitors based upon the timing information in the timing analysis report. Each event monitor may determine whether a specified event occurred during a simulation of the IC design. The method may also include simulating the IC design using a simulation stimulus provided by a test generator on a simulation test bench. The method may further include recording results from the one or more event monitors, and manipulating the test generator based upon the results to change the simulation stimulus during subsequent simulations.

In one specific implementation, the method may also include generating the event monitors using a timing criticality of the signal paths for selection of the specified events to monitor.

Figure 1:
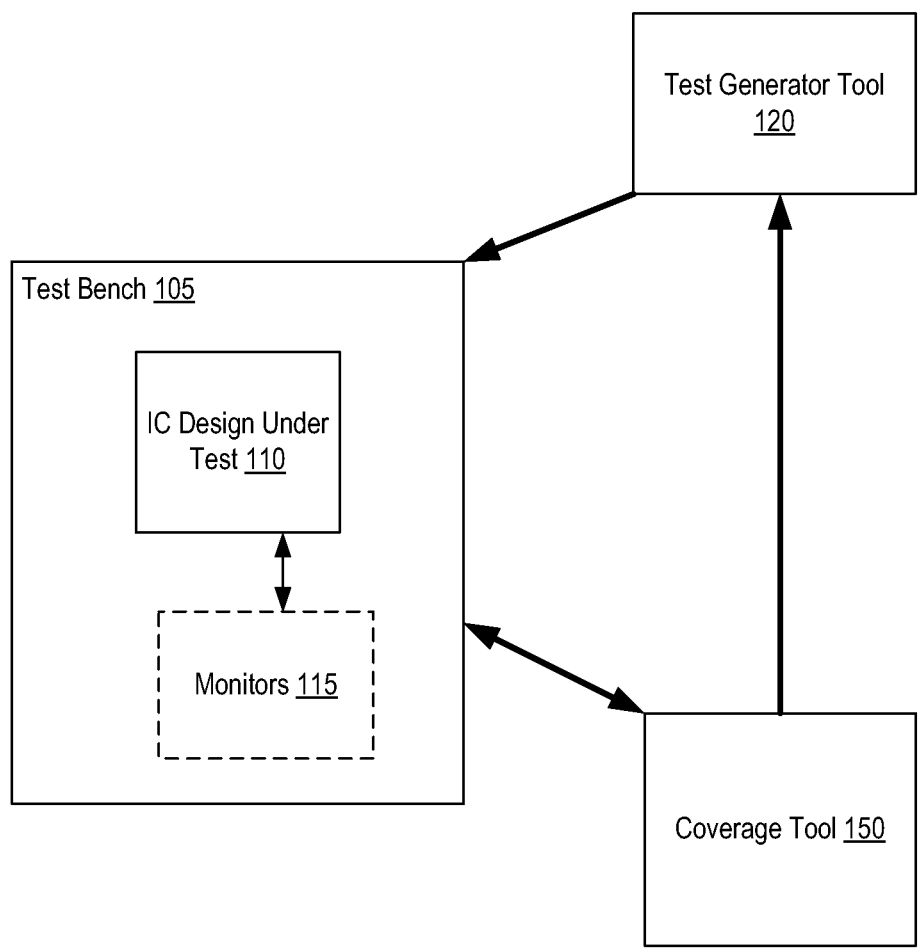
FIG. 1 is a conceptual diagram depicting one embodiment of a process for verifying functional coverage of the logic in an integrated circuit (IC) design during simulation.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Turning now to FIG. 1, a conceptual diagram depicting one embodiment of a process for verifying functional coverage of the logic in an integrated circuit (IC) design during simulation is shown. The IC design under test 110 is simulated using a test bench 105. The test bench 105 may apply to the reference IC design under test 110 a simulation stimulus generated by the test generator 120. The stimulus is typically a test pattern representing a predetermined group of signals and or instructions, for example. The test bench 105 may also monitor and record the results of the simulation using the monitors 115 and the coverage tool 150.

In various embodiments, the IC design under test 110 may be represented in a number of different ways. For example, the IC design may be represented as a register transfer level (RTL) representation, a gate-level netlist 235, and a transistor level netlist 240, among others. Accordingly, because the IC design under test 110 is typically instantiated into the test bench 105, dependent on what level the IC design under test 110 is represented, the test bench 105 that is used to simulate a given design may include different levels of logic depending on the level of hierarchy of the design within the context of the system. More particularly, if for example the IC design under test 110 is a processor, then test bench performs the functionality and provides the stimulus of the system in which the processor may reside. Likewise, if the IC design under test 110 were a functional unit within a processor, then the test bench 105 includes system logic and some of the logic of a processor, and the test bench would now include functionality and stimulus of the system in which the processor resides, as well as the functionality and stimulus of the processor that interfaces to the functional unit.

The test bench 105 may use monitors 115 or "event monitors" to identify and indicate whether specific events have occurred. More particularly, a monitor 115 may "look at" any nodes or signals that are visible in the IC design under test 110 and indicate whether or not a signal or set of signals matches conditions that have been set up in the monitor. Monitors 15 may be implemented in a variety of ways. In one embodiment, monitors 115 may be implemented in program instructions that are part of the test bench 105. In other embodiments, monitors 115 may be implemented as instructions that are called by the test bench 105 using, for example, an application programming interface (API) or the like. The use of event monitors will be described in greater detail below in conjunction with the description of FIG. 5.

The test generator tool 120 is configured to generate test patterns for use as simulation stimulus during simulation of the IC design under test 110. In one embodiment, the test generator tool 120 may be a directed random test generator (DRTG). The DRTG may produce pseudo random test patterns. However, the DTRG may be biased in various ways to produce test patterns that have a better chance of exercising specific functionality. Accordingly, test generator tool 120 may have one or more adjustments available that may provide a level of test pattern tuning.

In one embodiment, the coverage tool 150 may gather simulation results from the test bench 105, including results from the monitors 115. As described in greater detail below, these results may be used to manipulate the test generator tool 120 to produce patterns that may more effectively exercise a specific function of the design under test 110.

During the functional coverage simulations of the IC design under test 110, it is sometimes difficult to determine if the test patterns are exercising critical areas of the IC design. Accordingly, when performing DRTG-based simulations it would be helpful to know what parts of the design must be exercised. Thus an insight into where problems may lie may be gained by understanding how a logic circuit is created. More particularly, signal paths that have a great deal of logic complexity packed into them may be good candidates for problems. It is these types of circuits that may be prone to errors.

One way to identify such circuits and/or signal paths is through the use of static timing analysis. Specifically, a signal path or timing path that includes a lot of complex logic may have a higher likelihood of having issues meeting timing. Thus, a timing report generated through timing analysis will provide timing information for all timing paths. The timing information usually includes the logic that is included in each path along with the arrival time of a signal as it propagates through the timing path to the endpoint. In addition, the timing information includes the slack for the timing path. The slack typically refers to the amount of time positive or negative that a signal takes to arrive at a node or device as referenced to a specified arrival time (e.g., a setup or hold time). Timing paths that have some predetermined amount of slack may be identified as critical speed paths. These speed paths then, may be targeted for checking during simulation. Thus, the speed paths may be selected based upon their timing criticality, or how close the given speed path is to failing timing.

As described further below, monitors 115 may be generated based upon the timing information from the timing report. These event monitors may be generated to look specifically at selected speed paths and to indicate whether the selected speed paths have been exercised.

Figure 2:
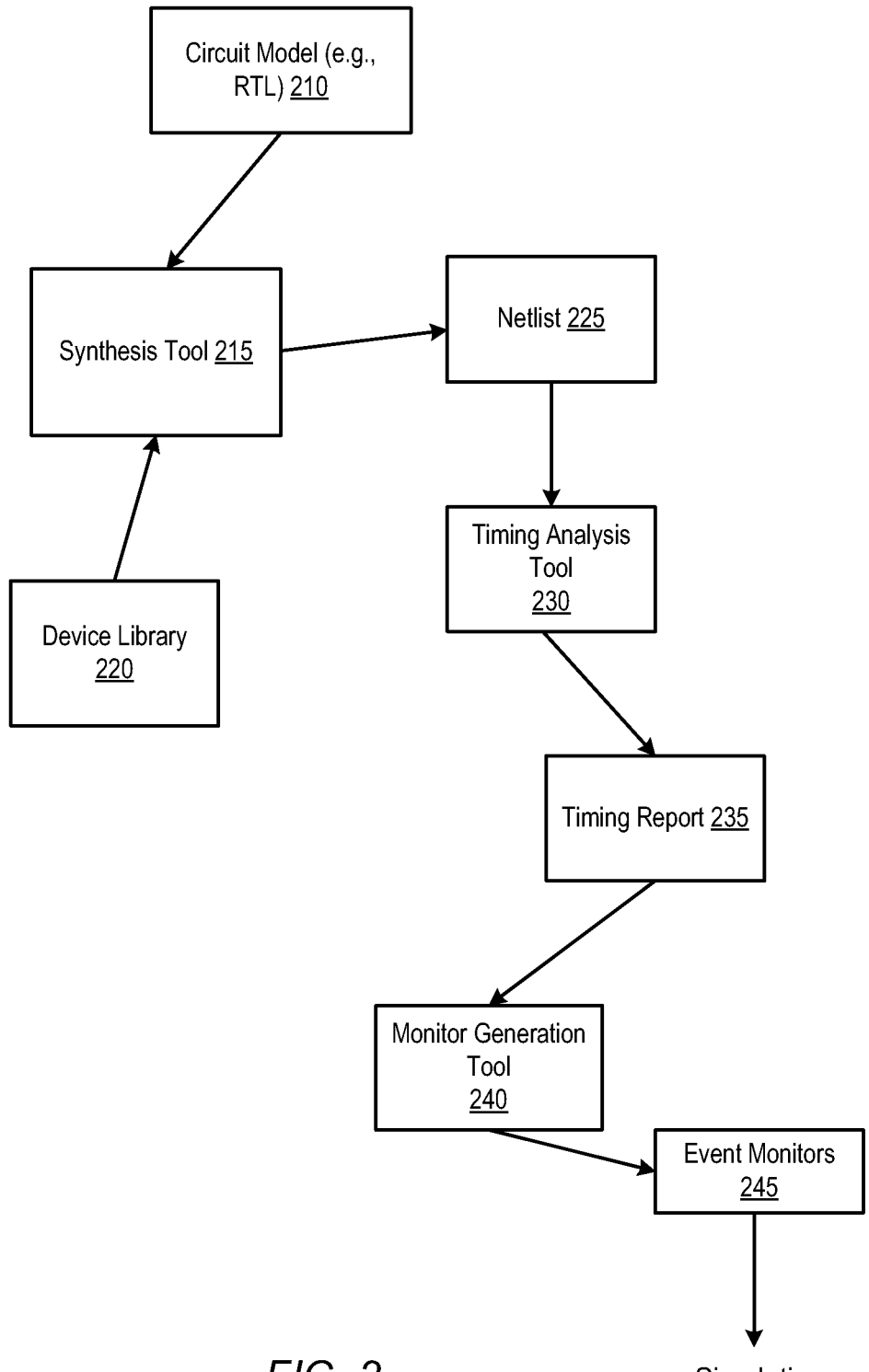
FIG. 2 is a conceptual diagram depicting one embodiment of a design flow for generating event monitors for use during simulation of an IC design.

Referring to FIG. 2, a conceptual diagram depicting one embodiment of a design flow for generating event monitors for use during simulation of an IC design is shown. In the IC design flow, a synthesis tool 215 may synthesize a circuit model 210 such as a synthesizable RTL model, for example, into a gate level netlist 225, using a particular device library 220. In one embodiment, the netlist 225 may be back annotated with delay information. A timing analysis tool 230 may perform timing analysis on the netlist 225, and generate a timing report 235.

As described above, the timing report 235 may include a listing of signal or timing paths in the netlist 225. Along with each path, the timing report 230 may include the timing slack for the entire path at the endpoint as well as the slack at each node or device.

In one embodiment, a monitor generation tool 240 may generate event monitors 245 from the information in the timing report 235. More particularly, the monitor generation tool 240 may identify some number of the worst-case speed paths in the timing report 235, and generate an event monitor for each of the speed paths. In one embodiment, the monitor generation tool 240 may identify the worst-case speed paths based upon some predetermined worst-case slack value or worst-case timing criticality. The event monitors 245 may then be used during subsequent simulation runs to determine whether the logic in these worst-case speed paths is being exercised. It is noted that the speed paths may be single-cycle (i.e., a signal propagates from a signal path starting point to an endpoint in one clock cycle) paths or multi-cycle (i.e., a signal propagates from a signal path starting point to an endpoint in more than one clock cycle) paths.

Figure 3:
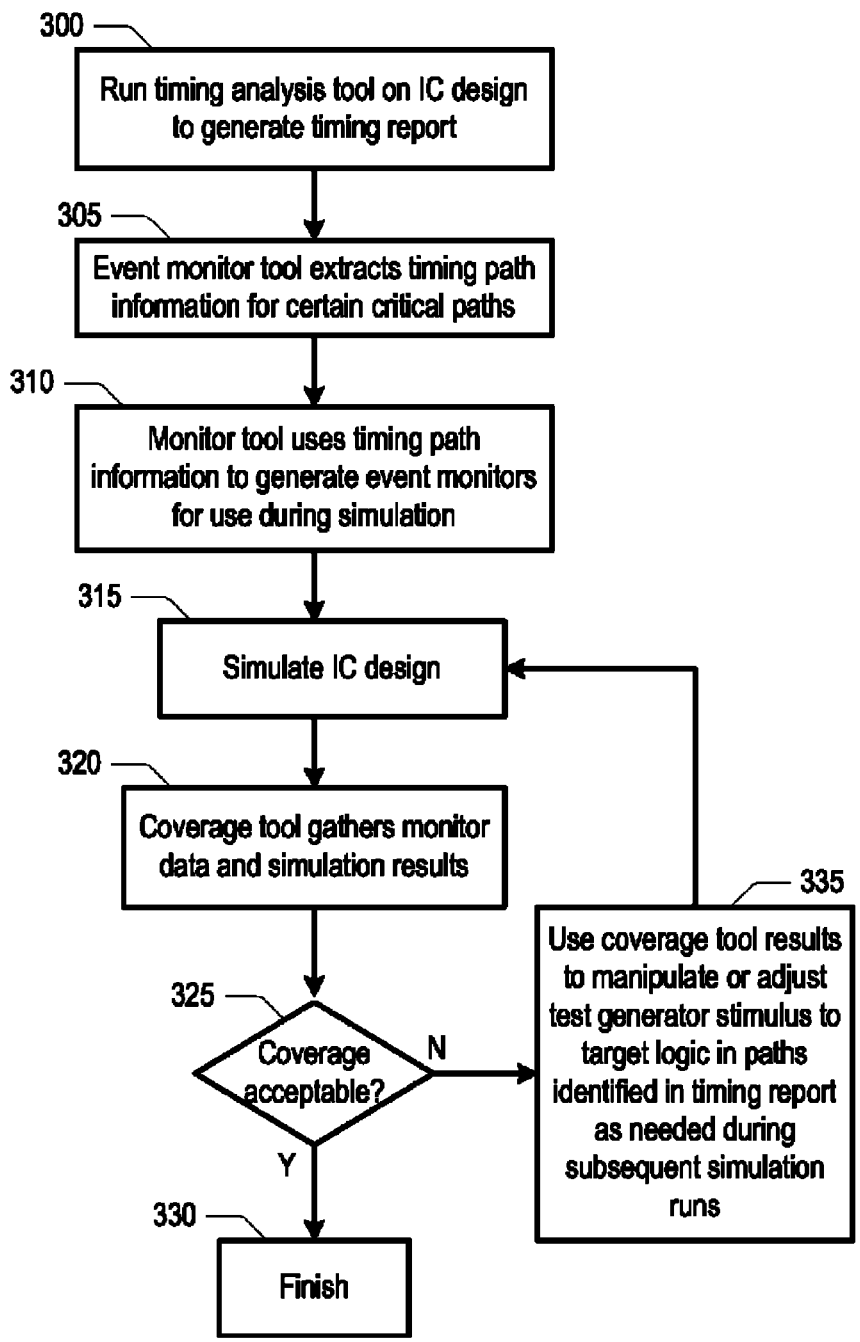
FIG. 3 is a flow diagram describing a method for verifying functional coverage of the logic in an IC design.

In FIG. 3, a flow diagram describing a method for verifying functional coverage of the logic in an IC design is shown. Referring collectively to FIG. 1 through FIG. 3, and beginning in block 300 of FIG. 3, a timing analysis is run on the IC design and a timing report is generated. Some number of timing paths having a slack that is less than some predetermined threshold value may be selected from the timing report (block 305). The monitor generation tool 240 generates event monitors that may determine whether a particular signal or set of signals satisfies a given condition (i.e., an event) during simulation (block 310). It is noted that in one embodiment, the monitor generation tool 240 may be an interactive tool that generates the event monitors 245 with the interaction of a user. However, in other embodiments, the monitor generation tool 240 may automatically generate the event monitors 245 without any user input.

The IC design under test is then simulated (block 315). During simulation the event monitors 245 record event occurrence information by logging the event occurrences and the coverage tool 150 may gather the monitor and simulation results (block 320). An exemplary speed path is shown in FIG. 4 and code segments used to monitor the speed path of FIG. 4 is shown below.

Figure 4:
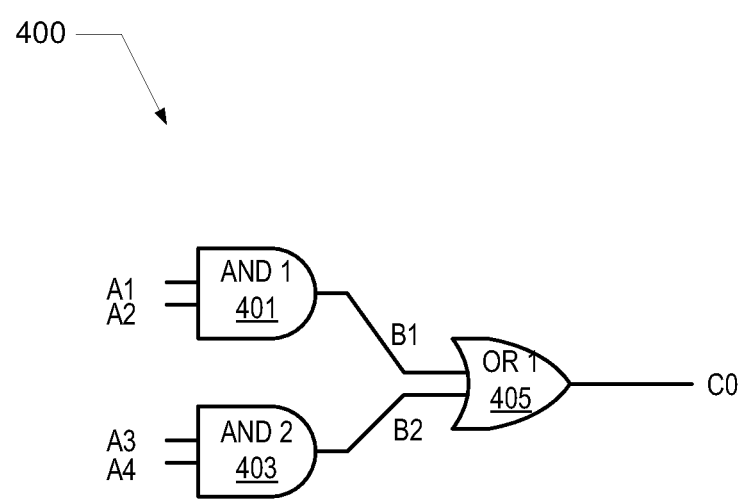
FIG. 4 is an exemplary block diagram of one embodiment of a logic circuit including a speed path.

Referring to FIG. 4, an exemplary block diagram of one embodiment of a logic circuit including a speed path is shown. The logic diagram 400 includes a two-input AND-gate 401 coupled to one input of a two-input OR-gate 405, and a two-input AND-gate 403 coupled to the other input of the OR-gate 405. If we assume that inputs A1 through A4 are driven by flip-flops clocked by some clock_1 (not shown), and the C0 feeds a flip-flop (not shown) that is also clocked by clock_1, then the output 'C0' of the OR-gate 405 may be the endpoint of this particular "speed path." Accordingly, an event monitor could be created to monitor C0 during simulation to determine if C0 transitions under the appropriate conditions. More particularly, an event monitor may be created that evaluates the logic states in the signal path of interest. For example, in the RTL code segment shown below, the monitor code may evaluate C0, but also A1, A2, and B1.

The following code pseudocode segment corresponds to an RTL representation of the circuit shown in FIG. 4.

```
signal A1, A2, A3, A4;
signal B1, B2;
signal C0;
B1 = (A1 & A2);
B2 = (A3 & A4);
C0 = (B1 | B2);
```

Based on the speed path assumption made above, also assume that a timing report that identifies some number of worst-case speed paths identifies signal C0 as one of the signals that is closest to failing timing.

An exemplary pseudocode timing report might look like the following for C0:

signal C0 has 5 picoseconds of slack; negedge clock1, posedge A1, posedge B1, posedge C0, posedge clock_1

Thus, the timing report indicates that the logic between clock edges (i.e., the path that went from A1→B1→C0 with the state of A1 being high, B1 being high, and C0 being high) is the path that has only 5 picoseconds of slack.

What may also be inferred from this is that signal A2 needed to be a high logic value so that the output B1 could be high. What may also be inferred is that signal B2 had to be a low logic value because if it was high, the output C0 would be high regardless of the value of B1. In various embodiments, timing analysis tools may be set up to provide timing reports that provide this information. In such embodiments, the appropriate information may be extracted automatically to create corresponding monitor code. In other embodiments, the needed values of the other signals to sensitize the critical path through the logic may be inferred upon inspection.

The following is a pseudocode example of an event monitor to detect the speed path C0.

```
monitor detect_speed_path
{
// define the signals
signal A1, A2;
signal B1, B2;
signal C0;
signal clock1;
    // attach the signals into the design
    A1 = attach("top.A1");
    A2 = attach("top.A2");
    B1 = attach("top.B1");
    B2 = attach("top.B2");
    // A3 and A4 are don't cares, we just
    // need to ensure that B2 is low
    C0 = attach("top.C0");
    clock_1 = attach("top.clock_1");
    // wait for clock1 to toggle
    wait (posedge(clock_1));
    // See if the path C0 is hit
    if (((A1.get_value( ) == 1) && (A2.get_value( ) == 1)))
        {
        // A1 and A2 are high
        if ((B1.get_value( ) == 1) && (B2.get value( ) == 0))
            {
                // the or gate is also in the right state - the
                output of the top AND gate is high, the bottom one
                is low
                if (C0.get_value( ) == 1)
                {
                // the critical path is hit, log the event
                log_event(detect_speed_path);
                }
            }
        }
    // take no action, no event
}
```

The above monitor code is configured to detect and log the event in which the speed path from A1→B1→C0 is sensitized as described above. In one embodiment, the event logs may be gathered by the coverage tool 150.

Referring back to FIG. 3, in one embodiment, the coverage tool 150 may include predetermined coverage parameters. If the coverage exceeds the parameters and is acceptable (block 325), the functional coverage simulations are complete (block 330). However, if the coverage is not acceptable such as, for example, if the event monitor logs indicate that the speed paths have not been sufficiently exercised, then the coverage tool results may be used to manipulate the test generator tool 120 as described above. More particularly, the test generator tool 120 may be adjusted to produce patterns that may exercise specific portions of the IC design under test 110 (e.g., the logic in the speed paths being monitored) (block 335). Once the test generator tool 120 has been adjusted, the IC design under test 11 may be simulated again as described above in conjunction with the description of block 315. This may be an iterative process of simulating and adjusting the generator tool 120 until a sufficient comfort level that the coverage is adequate is reached.

Figure 5:
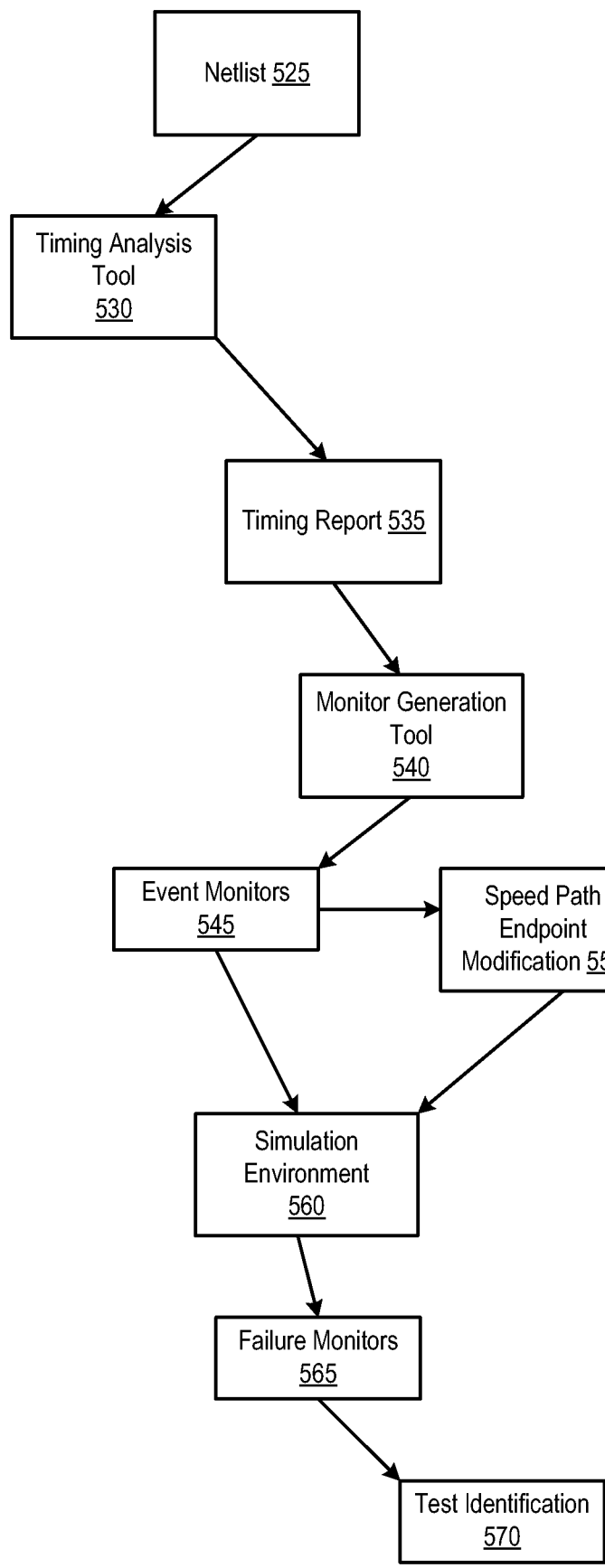
FIG. 5 is a conceptual diagram depicting one embodiment of design flow for identifying speed path tests during simulation of an IC design.

Turning now to FIG. 5, a conceptual diagram depicting one embodiment of design flow for identifying speed path tests during simulation of an IC design is shown. Similar to the IC design flow shown in FIG. 2, a gate level netlist 525 may be created by a synthesis tool. A timing analysis tool 530 may perform timing analysis on the netlist 525, and generate a timing report 535. As described above, the timing report 235 may include a listing of signal or timing paths in the netlist 525. In addition, in one embodiment, a monitor generation tool 540 may generate event monitors 545 from the information in the timing report 535 as described above. The event monitors 545 may then be used during subsequent simulation runs to determine whether the logic in these worst-case speed paths is being exercised as described above.

In addition, since the event monitors have access to nodes and signals that are internal to the device and which may not be visible at an architecturally visible structure, test patterns need to exercise the device in a way that makes the failure visible at an architecturally visible structure. For example, to test the IC design once it is fabricated, failures need to be visible on a production tester, or similar testing device. In many cases, these testers only have access to architecturally visible structures such as control, status registers, special test mode registers, input and output pins, etc, of the device.

Accordingly, the information used to create the event monitors that can detect speed path sensitization may also be used to create code to modify a speed path endpoint to force a speed path to a failing value during a remainder of a simulation run. Specifically, in one embodiment, a speed path endpoint modification 555 may be performed to force a failing value on the endpoint. Once the simulation environment 560 has been modified to both detect the sensitization of the speed path, and to force a failure of the speed path at an internal node, the simulation results may be checked 560 to determine if the speed path failure is visible at an architecturally visible point so that a test and/or test pattern may be identified to check for this failure 570.

Referring back to FIG. 4, to determine if a failure event detected at C0 is observable by the simulation environment at an architecturally visible structure, in one embodiment, the monitor code shown above may be modified to force a particular state at C0 (or any desired node in the general case). More particularly, C0 may be forced to a logic value of zero for the current cycle of the simulation run once the speed path is detected. If a corresponding failure shows up at an architecturally visible structure during the remainder of the simulation, then the failure at C0 may be considered to be observable on a manufactured device using a test platform. As described further below in conjunction with the description of FIG. 6, this type of speed path testing may be useful when testing manufactured devices across frequencies to determine which devices can operate at what frequencies. This type of device testing is commonly referred to as speed binning.

In one embodiment, the following pseudocode segment or one that is functionally similar may be added to the above pseudocode segment right after the log_event statement.

```
if (simulate_speed_path_failure)
{
    C0.set_value(0);
}
```

In other embodiments, this or a similar pseudocode segment may be a stand-alone segment that may be used after the event monitors are run.

In the above pseudocode segment, a flag (e.g., simulate_speed_path_failure) may be used to determine whether or not to force a value after a speed path detection. In the above example, if the flag is set, then the signal C0 is forced to a logic value of zero, and simulations may resume.

Figure 6:
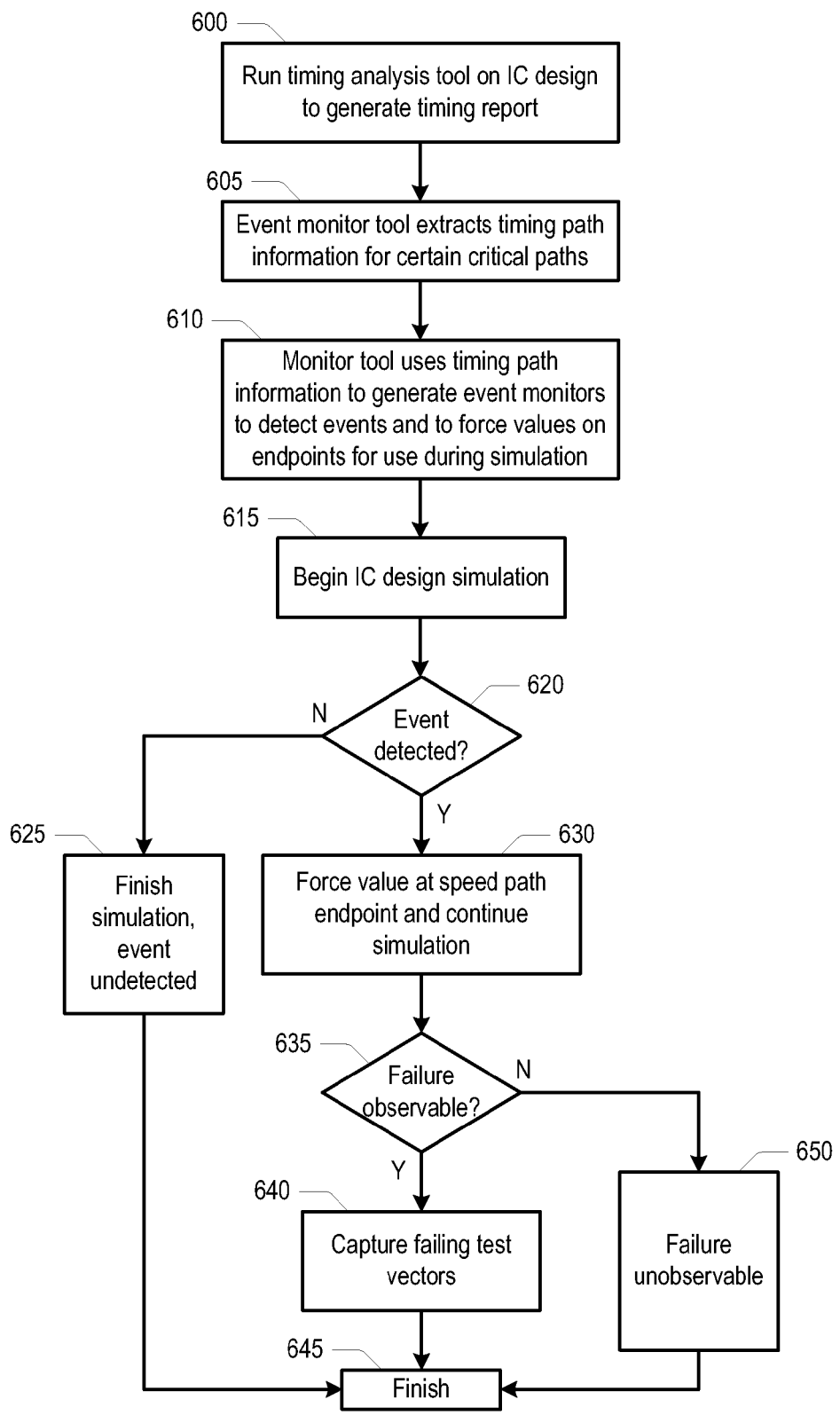
FIG. 6 is a flow diagram describing a method for identifying speed path tests for an IC design.

A flow diagram describing a method for identifying speed path tests for an IC design is shown in FIG. 6. Referring collectively to FIG. 4 through FIG. 6 and beginning in block 600 of FIG. 6, once the timing analysis is run on the IC design and a timing report is generated, some number of timing paths having a slack that is less than some predetermined threshold value may be selected from the timing report (block 605). As described above, the monitor generation tool 540 generates event monitors that may determine whether a particular signal or set of signals satisfies a given condition (i.e., an event) during simulation. In addition, as described above, the monitor generation tool 540 may also generate a monitor that may be configured to force a value onto an endpoint of a speed path, once that speed path has been identified as being sensitized. Accordingly, in one particular embodiment, the monitor code may include conditional statements to include the forcing of values on endpoints (block 610).

It is noted that as described above, in one embodiment, the monitor generation tool 540 may be an interactive tool that generates the event monitors 545 with the interaction of a user. However, in other embodiments, the monitor generation tool 540 may automatically generate the event monitors 545 without any user input.

In block 615 the IC design simulation is started. During simulation the event monitors 545 record or log event occurrence information. If an event monitor does not detect the event (block 620), then no event is detected and the simulation continues to completion (block 645). However, if the event monitor detects the event (block 620), the monitor may log the event, force a failing value on the endpoint of the speed path that was detected for the current clock cycle, and continue the simulation (block 630). As the simulation continues, the coverage tool gathers the monitor and simulation results. If a failure that corresponds to the forced failure appears at an observable point as described above (block 635), the test vectors that were used may be captured (block 640) and the simulation is complete (block 645). These test vectors may be used to create a production device test.

Referring back to block 635, in one embodiment, the coverage tool 150 may include predetermined coverage parameters. If a failure that corresponds to the forced failure does not appear at an observable point at the completion of the simulation, the failure is considered to be not observable (block 650). As such, different test patterns may be attempted in an effort to cause the failure to be observable depending on a number of factors including the overall test coverage, the nature of the failure, and so on. If more test patterns are going to be run, operation would continue as described above in conjunction with the description of block 615, otherwise the simulations are complete (block 645).

It is noted that as mentioned above, in one embodiment, respective monitors may be created to perform event detection and endpoint force failures. However, in another embodiments, a monitor may include functionality to both detect an event and to force a failure once the event is detected.

Figure 7:
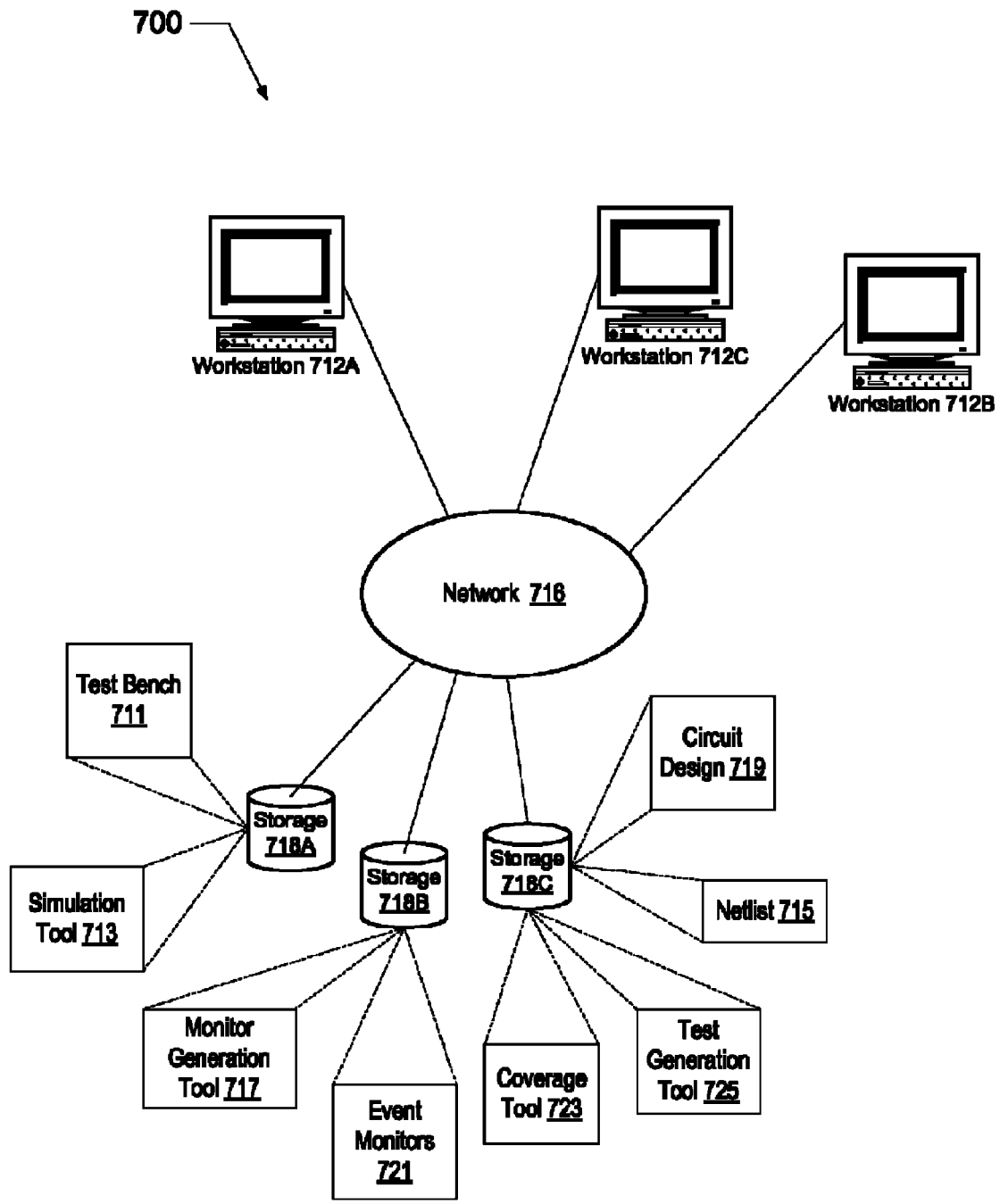
FIG. 7 is a block diagram of one embodiment of a system for implementing a tool verifying functional coverage and speed path failure test for an IC design.

Turning to FIG. 7, a block diagram of one embodiment of a system for implementing a tool for performing functional equivalence between a reference IC design and a modified version of the reference IC design is shown. Computer system 700 includes a plurality of workstations designated 712A through 712C. The workstations are coupled together through a network 716 and to a plurality of storages designated 718A through 718C. In one embodiment, each of workstations 712A-712C may be representative of any standalone computing platform that may include, for example, one or more processors, local system memory including any type of random access memory (RAM) device, monitor, input output (I/O) means such as a network connection, mouse, keyboard, monitor, and the like (many of which are not shown for simplicity).

In one embodiment, storages 718A-718C may be representative of any type of non-transitory computer readable storage device such as hard disk systems, optical media drives, tape drives, ram disk storage, and the like. As such, the program instructions comprising the design tools may be stored within any of storages 718A-718C and loaded into the local system memory of any of the workstations during execution. As an example, as shown in FIG. 7, the test bench tool 711 and the simulation tool 713 are shown stored within storage 718A, while the netlist(s) 715, circuit design (e.g., behavioral, RTL, etc) 719, test generation tool 725, and the coverage tool 7230 are stored within storage 718C. Further, the monitor generation tool 717, and the event monitors 721 are stored within storage 718B. Additionally, the program instructions may be stored on a portable/removable storage media. The program instructions may be executed directly from the removable media or transferred to the local system memory of a given workstation 712 or mass storages 718 for subsequent execution. As such, the portable storage media, the local system memory, and the mass storages may be referred to as non-transitory computer readable storage mediums. The program instructions may be executed by the one or more processors on a given workstation or they may be executed in a distributed fashion among the workstations, as desired.

In one embodiment, the monitor generation tool 717 may include program instructions written in any of a variety of programming languages or scripting languages, and which may be executable by a processor to create the event monitors 721, which depending on the specific implementation may or may not include the endpoint force fail functionality.

It is noted that although the computer system shown in FIG. 7 is a networked computer system, it is contemplated that in other embodiments, each workstation may also include local mass storage. In such embodiments, the program instructions and the results of the design tools may be stored locally. Further, it is contemplated that the program instructions may be executed on a standalone computer such as a personal computer that may include local mass storage and a system memory.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    receiving a timing analysis report generated from a timing analysis of an integrated circuit (IC) design, wherein the timing analysis report includes timing information corresponding to an arrival time of signals conveyed on signal paths in the IC design;
    generating one or more event monitors based upon the timing information in the timing analysis report, wherein each event monitor determines whether a specified event occurred during a simulation of the IC design;
    a processor simulating the IC design using one or more simulation test patterns on a simulation test bench, wherein the one or more simulation test patterns are provided by a test generator;
    recording results from the one or more event monitors;
    manipulating the test generator based upon the results to change the simulation test patterns during subsequent simulations;
    wherein manipulating the test generator includes adjusting the test generator output to preferentially generate test patterns that sensitize logic within the IC design that is being monitored by one or more of the event monitors.

2. The method as recited in claim 1, wherein generating the one or more event monitors includes using a timing criticality of the signal paths for selection of the specified events to monitor.

3. The method as recited in claim 2, further comprising identifying signal paths that are above a predetermined level of timing criticality and generating one or more event monitors that record an occurrence of one or more of the specified events corresponding to logic that contributes to the timing criticality.

4. The method as recited in claim 1, wherein the signal paths are single-cycle paths.

5. The method as recited in claim 1, wherein the signal paths are multiple-cycle paths.

6. A non-transitory computer readable storage medium including program instructions for verifying functionality of an integrated circuit (IC) design, the program instructions are executable by a processor to:
    receive a timing analysis report generated from a timing analysis of an IC design, wherein the timing analysis report includes timing information corresponding to an arrival time of signals for timing paths in the IC design;
    automatically generate one or more event monitors based upon the timing information in the timing report, wherein each event monitor is configured to determine whether a specified event occurred during a simulation of the IC design;
    simulate the IC design using one or more simulation test patterns on a simulation test bench, wherein the one or more simulation test patterns are provided by a test generator;
    record results from the one or more event monitors;
    generate coverage information for use in manipulating the test generator to change the simulation test patterns during subsequent simulations;
    wherein manipulating the test generator includes adjusting the test generator output to preferentially generate test patterns that sensitize logic within the IC design that is being monitored by one or more of the event monitors.

7. The non-transitory computer readable storage medium as recited in claim 6, wherein the program instructions are further executable by the processor to select the specified events to monitor based upon a timing criticality of the signal paths.

8. The non-transitory computer readable storage medium as recited in claim 7, wherein the program instructions are further executable by the processor to identify signal paths that are above a predetermined threshold of timing criticality and to generate one or more event monitors that determine whether one or more of the specified events corresponding to logic that contributes to the timing criticality has occurred.

9. A system comprising:
    a memory storing program instructions for verifying functionality of an integrated circuit (IC) design;
    a processor coupled to the memory, wherein the processor, in response to executing the instructions is configured to:
        receive a timing analysis report generated from a timing analysis of an IC design, wherein the timing analysis report includes timing information corresponding to an arrival time of signals for timing paths in the IC design;

automatically generate one or more event monitors based upon the timing information in the timing report, wherein each event monitor is configured to determine whether a specified event occurred during a simulation of the IC design;

simulate the IC design using one or more simulation test patterns on a simulation test bench, wherein the one or more simulation test patterns are provided by a test generator;

record results from the one or more event monitors;

generate coverage information for use in manipulating the test generator to change the simulation test patterns during subsequent simulations;

wherein manipulating the test generator includes adjusting the test generator output to preferentially generate test patterns that sensitize logic within the IC design that is being monitored by one or more of the event monitors.

10. The system as recited in claim 9, wherein the processor is further configured to use a timing criticality of the signal paths for selection of the specified events to monitor.

11. The system as recited in claim 10, wherein the processor is further configured to identify timing paths that are above a predetermined level of timing criticality and to generate one or more event monitors that record an occurrence of one or more of the specified events corresponding to logic that contributes to the timing criticality.

12. A method comprising:
performing by a processor:
generating one or more event monitors based upon timing information received in a timing analysis report generated from a timing analysis of an integrated circuit (IC) design, wherein the timing information corresponds to an arrival time of signals conveyed on signal paths in the integrated circuit (IC) design;

wherein each event monitor determines whether a specified event occurred during a simulation of the IC design;

simulating the IC design on a simulation test bench using one or more simulation test patterns that are provided by a test generator;

recording results produced by the one or more event monitors during simulation;

selectively manipulating the simulation test patterns based upon the results;

wherein manipulating the simulation test patterns includes preferentially generating test patterns that sensitize logic within the IC design that is being monitored by a given event monitor.

13. The method as recited in claim 12, further comprising manipulating the simulation test patterns in response to the given event monitor result indicating that a corresponding event occurred fewer than a predetermined number of times.

14. The method as recited in claim 12, wherein generating the one or more event monitors includes identifying signal paths that have a timing criticality above a predetermined level.

15. The method as recited in claim 14, wherein a given event monitor records an occurrence of one or more of the specified events in logic that contributes to the timing criticality.

16. A non-transitory computer readable storage medium including program instructions for verifying functionality of an integrated circuit (IC) design, the program instructions are executable by a processor to:

generate one or more event monitors based upon timing information received in a timing analysis report generated from a timing analysis of an integrated circuit (IC) design, wherein the timing information corresponds to an arrival time of signals conveyed on signal paths in the integrated circuit (IC) design;

wherein each event monitor determines whether a specified event occurred during a simulation of the IC design;

simulate the IC design on a simulation test bench using one or more simulation test patterns that are provided by a test generator;

record results produced by the one or more event monitors during simulation; and generate coverage information for use in selectively manipulating the simulation test patterns based upon the results;

wherein manipulating the simulation test patterns includes preferentially generating test patterns that sensitize logic within the IC design that is being monitored by a given event monitor.

17. The non-transitory computer readable storage medium as recited in claim 16, wherein the program instructions are further executable by the processor to identify signal paths that have an arrival time that is close to a threshold arrival time as critical paths and to generate an event monitor for each of the critical paths.

* * * * *